(12) United States Patent
Kim et al.

(10) Patent No.: US 10,341,058 B2
(45) Date of Patent: Jul. 2, 2019

(54) METHOD FOR TRANSMITTING AND RECEIVING MULTI-STATION BLOCK ACK FRAME OF EXPANDED CAPACITY AND DEVICE THEREFOR

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/756,921

(22) PCT Filed: Sep. 1, 2016

(86) PCT No.: PCT/KR2016/009785
§ 371 (c)(1),
(2) Date: Mar. 1, 2018

(87) PCT Pub. No.: WO2017/039349
PCT Pub. Date: Mar. 9, 2017

(65) Prior Publication Data
US 2018/0254857 A1    Sep. 6, 2018

Related U.S. Application Data

(60) Provisional application No. 62/213,633, filed on Sep. 3, 2015.

(51) Int. Cl.
*H04L 1/16* (2006.01)
*H04L 5/00* (2006.01)
(Continued)

(52) U.S. Cl.
CPC .......... *H04L 1/1621* (2013.01); *H04L 1/1614* (2013.01); *H04L 5/00* (2013.01);
(Continued)

(58) Field of Classification Search
CPC ....... H04L 1/1621; H04L 1/1614; H04L 5/00; H04L 5/0055; H04L 2001/0093; H04W 84/12
See application file for complete search history.

(56) References Cited

U.S. PATENT DOCUMENTS 9,253,290 B2 *  2/2016  Asterjadhi .............. H04L 69/04
9,337,961 B2 *  5/2016  Wentink ................ H04L 1/1607
(Continued)

FOREIGN PATENT DOCUMENTS

WO     2011102575     8/2011

OTHER PUBLICATIONS

PCT International Application No. PCT/KR2016/009785, Written Opinion of the International Searching Authority dated Dec. 14, 2016, 16 pages.
(Continued)

*Primary Examiner* — Duc C Ho
(74) *Attorney, Agent, or Firm* — Lee, Hong, Degerman, Kang & Waimey PC

(57) ABSTRACT

Disclosed are a method and a device by which an access point (AP) transmits a block ACK (BA) signal for transmission data of a plurality of stations (STAs) in a wireless LAN (WLAN) system. To this end, an AP receives data from a plurality of STAs, and transmits a first multi-STA BA frame (M-BA frame) for the data received from the plurality of STAs, wherein the first M-BA frame includes a MAC header field, a BA control field, and a BA information field, a last N bit of the BA control field indicates at least one from among the number of pieces of BA information included in
(Continued)

the first M-BA frame and information on a succeeding ACK frame, and N is set to 5 or more.

13 Claims, 12 Drawing Sheets

(51) Int. Cl.
*H04W 84/12* (2009.01)
*H04L 1/00* (2006.01)

(52) U.S. Cl.
CPC .... *H04L 5/0055* (2013.01); *H04L 2001/0093* (2013.01); *H04W 84/12* (2013.01)

(56) References Cited

U.S. PATENT DOCUMENTS

| | | | |
|---|---|---|---|
| 2011/0090855 A1 | 4/2011 | Kim | |
| 2011/0235593 A1 | 9/2011 | Gong et al. | |
| 2011/0261742 A1 | 10/2011 | Wentink | |
| 2012/0207087 A1* | 8/2012 | Wentink | H04L 1/1614 370/328 |
| 2015/0288501 A1* | 10/2015 | Kwon | H04L 5/0007 370/329 |

OTHER PUBLICATIONS

Kwon, Y. et al., "Issues on UL-OFDMA Transmission", doc.: IEEE 802.11-14/1431r1, Sep. 2014, 19 pages.

\* cited by examiner

FIG. 5

| | B0 | B1 | B2 | B3 | B4    B11 | B12    B15 |
|---|---|---|---|---|---|---|
| | BA Ack Policy | Multi-TID | Compressed Bitmap | GCR | Reserved | TID_INFO |
| Bits: | 1 | 1 | 1 | 1 | 8 | 4 |

FIG. 6

| Block Ack Starting Sequence Control | Block Ack Bitmap |
|---|---|
| Octets:  2 | 128 |

FIG. 7

| | B0        B3 | B4        B15 |
|---|---|---|
| | Fragment Number (0) | Starting Sequence Number |
| Bits: | 4 | 12 |

Octets :                     2                                    8

FIG. 14

| | B0 | B1 | B2 | B3 | B4    B9 | B10    B11 | B12    B15 |
|---|---|---|---|---|---|---|---|
| | BA ACK Policy | Multi-TID | Compressed Bitmp | GCR | Reserved | TID_INFO (MSB) | TID_INFO |
| Bits: | 1 | 1 | 1 | 1 | 6 | 2 | 4 |

FIG. 15

| | B0 | B1 | B2 | B3 | B4    B10 | B11 | B12    B15 |
|---|---|---|---|---|---|---|---|
| | BA ACK Policy | Multi-TID | Compressed Bitmp | GCR | Reserved | M-BA Extension | TID_INFO |
| Bits: | 1 | 1 | 1 | 1 | 7 | 1 | 4 |

METHOD FOR TRANSMITTING AND RECEIVING MULTI-STATION BLOCK ACK FRAME OF EXPANDED CAPACITY AND DEVICE THEREFOR

CROSS-REFERENCE TO RELATED APPLICATIONS

This application is the National Stage filing under 35 U.S.C. 371 of International Application No. PCT/KR2016/009785, filed on Sep. 1, 2016, which claims the benefit of U.S. Provisional Application No. 62/213,633, filed on Sep. 3, 2015, the contents of which are all hereby incorporated by reference herein in their entirety.

TECHNICAL FIELD

The following description relates to a method and device for transmitting and receiving a multi-station (STA) BA frame (M-BA frame) from among block ACK (BA) frames for efficiently transmitting an ACK signal for multi-user or multi-STA data in a wireless LAN system and, specifically, to improvement of capacity of a M-BA frame.

BACKGROUND ART

Standards for a Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE

Technical Problem

In the IEEE 802.11ax standards, an Uplink (UL) Orthogonal Frequency Division Multiple Access (OFDMA) transmission scheme and a UL Multi-User (MU) transmission scheme will be used. Then, an Access Point (AP) may receive UL MU frames from a plurality of STAs at the same transmission opportunity and needs to transmit an Acknowledgement (ACK) frame in response to the UL MU frames.

In this case, efficient transmission of an ACK signal to a plurality of STAs through a Block ACK (BA) frame may be considered. However, overhead may be problematic due to an increased size of an MU BA frame for a plurality of STAs.

Furthermore, when a conventional multi-TID BA frame is reused, limitation of capacity of the multi-TID BA frame may become a problem.

A method and device for efficiently transmitting acknowledgement/negative-acknowledgement signals in the above-described UL MU transmission situation will be described.

Technical Solution

To accomplish the aforementioned object, one aspect of the present invention proposes a method by which an access point (AP) transmits block ACK (BA) signals for data transmitted from a plurality of stations (STAs) in a wireless LAN (WLAN) system, including: receiving data from the plurality of STAs; and transmitting a first multi-STA BA frame (M-BA frame) for data received from the plurality of STAs, wherein the first M-BA frame includes a MAC header field, a BA control field and a BA information field, last N bits of the BA control field indicate at least one of the number of pieces of BA information included in the first M-BA frame and information on a succeeding ACK frame, and N is set to 5 or more.

Specifically, the last N bits of the BA control field may indicate the number of pieces of BA information included in the first M-BA frame and may be set to be equal to or greater than a maximum number of the plurality of STAs.

In addition, last M (M<N) bits of the BA control field may indicate the number of pieces of BA information included in the first M-BA frame, and N−M bits preceding the last M bits of the BA control field may indicate that the succeeding ACK frame is a second M-BA frame.

In this case, the first M-BA frame may include as many pieces of BA information as indicated by the last M bits of the BA control field from among the BA information on the plurality of STAs, and the second M-BA frame may include BA information that is not included in the first M-BA frame from among the BA information on the plurality of STAs.

M is assumed to be 4.

Last M bits (M<N) of the BA control field may indicate the number of pieces of BA information included in the first M-BA frame, and N−M bits preceding the last M bits of the BA control field may indicate that an ACK policy has changed to BA.

In this case, the first M-BA frame may include as many pieces of BA information as indicated by the last M bits of the BA control field from among the BA information on the plurality of STAs, and BA information that is not included in the first M-BA frame from among the BA information on the plurality of STAs may be transmitted through a succeeding BA frame as the ACK policy is changed to BA.

The method may further includes: receiving a BA request frame (BAR frame) from one or more STAs corresponding to BA information that is not included in the first M-BA frame from among the BA information on the plurality of STAs; and transmitting the succeeding BA frame in response to reception of the BAR frame.

The method may further include transmitting a trigger frame (TF) for inducing one or more STAs corresponding to BA information that is not included in the first M-BA frame from among the BA information on the plurality of STAs to transmit a BA request frame (BAR frame) along with the first M-BA frame or following the first M-BA frame.

Here, M may be set to 4.

Another aspect of the present invention proposes a method by which a station (STA) receives a block ACK (BA) signal for transmitted data from an access point (AP) in a wireless LAN (WLAN) system, including: transmitting data to the AP; and receiving a first multi-STA BA frame (M-BA frame) from the AP, wherein the first M-BA frame includes a MAC header field, a BA control field and a BA information field, last N bits of the BA control field indicate at least one of the number of pieces of BA information included in the first M-BA frame and information on a succeeding ACK frame, and N is set to 5 or more.

Another aspect of the present invention proposes an access point (AP) device for transmitting block ACK (BA) signals for data transmitted from a plurality of stations (STAs) in a wireless LAN (WLAN) system, including: a transceiver configured to receive data from the plurality of STAs and to transmit a first M-BA frame for data received from the plurality of STAs; and a processor connected to the transceiver to process the received data and the first M-BA frame, wherein the processor is configured such that the first M-BA frame includes a MAC header field, a BA control field and a BA information field, last N bits of the BA control field indicate at least one of the number of pieces of BA information included in the first M-BA frame and information on a succeeding ACK frame, and N is set to 5 or more.

Another aspect of the present invention proposes a station (STA) device for receiving a block ACK (BA) signal from an access point (AP) in a wireless LAN (WLAN) system, including: a transceiver configured to transmit data to the AP and to receive a first multi-STA BA frame (M-BA frame) from the AP; and a processor connected to the transceiver to process the transmitted data and the first M-BA frame, wherein the processor processes the first M-BA frame on the assumption that the first M-BA frame includes a MAC header field, a BA control field and a BA information field, last N bits of the BA control field indicate at least one of the number of pieces of BA information included in the first M-BA frame and information on a succeeding ACK frame, and N is set to 5 or more.

Advantageous Effects

According to the present invention, an AP can flexibly transmit acknowledgement/negative-acknowledgement signals to a plurality of STAs in a UL MU transmission situation.

DESCRIPTION OF DRAWINGS

FIG. 5 is a diagram illustrating a detailed configuration of a BA Control field in FIG. 4.

FIG. 6 is a diagram illustrating a detailed configuration of a BA Information field in FIG. 4.

FIG. 7 is a diagram illustrating a configuration of a Block ACK Start Sequence Control subfield.

FIG. 14 is a diagram for explaining a method of extending the capacity of an M-BA frame according to an embodiment of the present invention.

FIG. 15 is a diagram for explaining a method of extending the capacity of an M-BA frame according to another embodiment of the present invention.

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, the following description relates to a method for efficiently utilizing a channel having a wide bandwidth in a WLAN system and an apparatus therefor. To this end, a WLAN system to which the present invention is applicable will be described first in detail.

Figure 1:
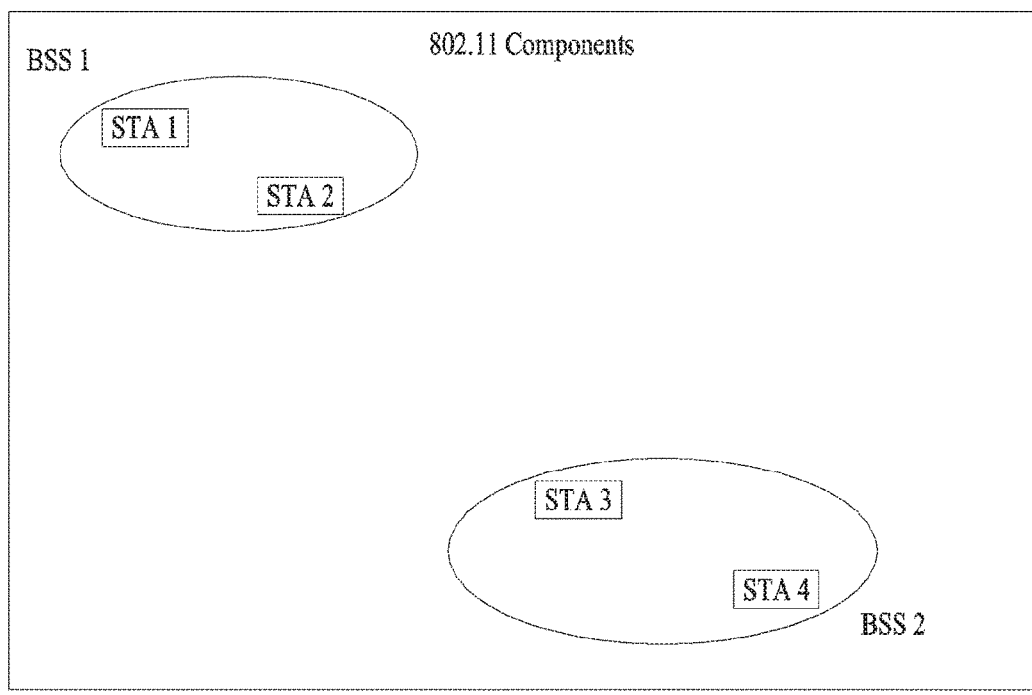
FIG. 1 is a diagram illustrating an exemplary configuration of a WLAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
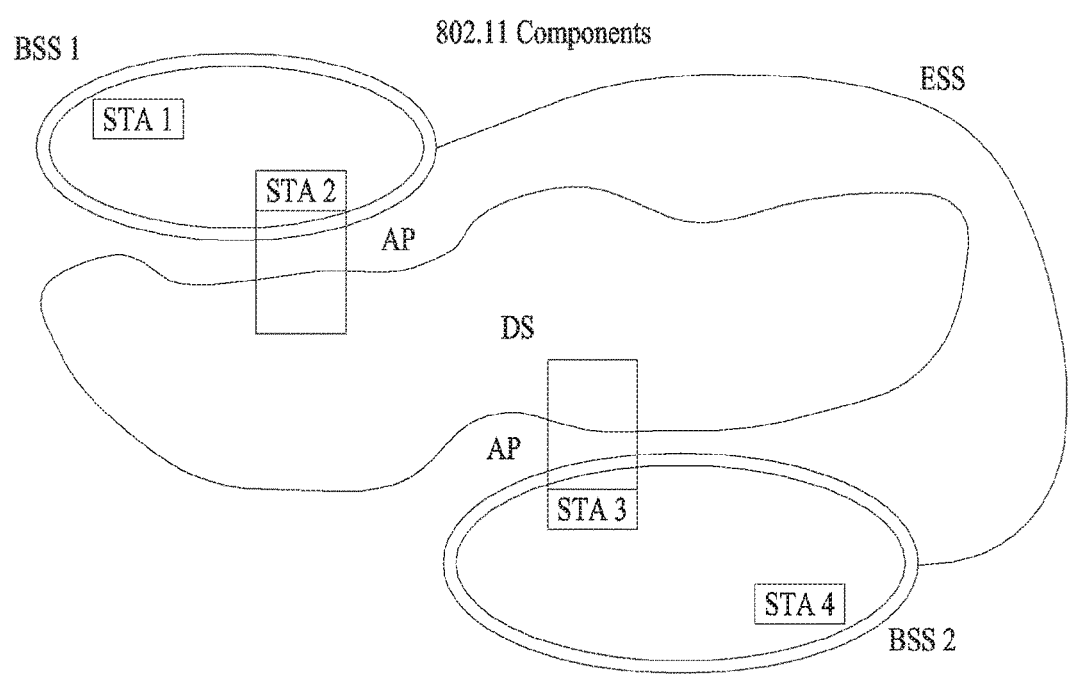
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above description, a block ACK scheme in a WLAN system will be described hereinbelow.

A block ACK mechanism is a scheme of improving channel efficiency by aggregating and then transmitting a plurality of ACKs in one frame. There are two types of block ACK mechanism schemes: an immediate ACK scheme and a delayed ACK scheme. The immediate ACK scheme may be suitable for high-bandwidth, low-latency traffic transmission, whereas the delayed ACK scheme is favorable for applications that can tolerate latency. Unless particularly specified otherwise in the below description, an STA that transmits data using the block ACK mechanism is referred to as an originator and an STA that receives the data using the block ACK mechanism is referred to as a recipient.

Figure 3:
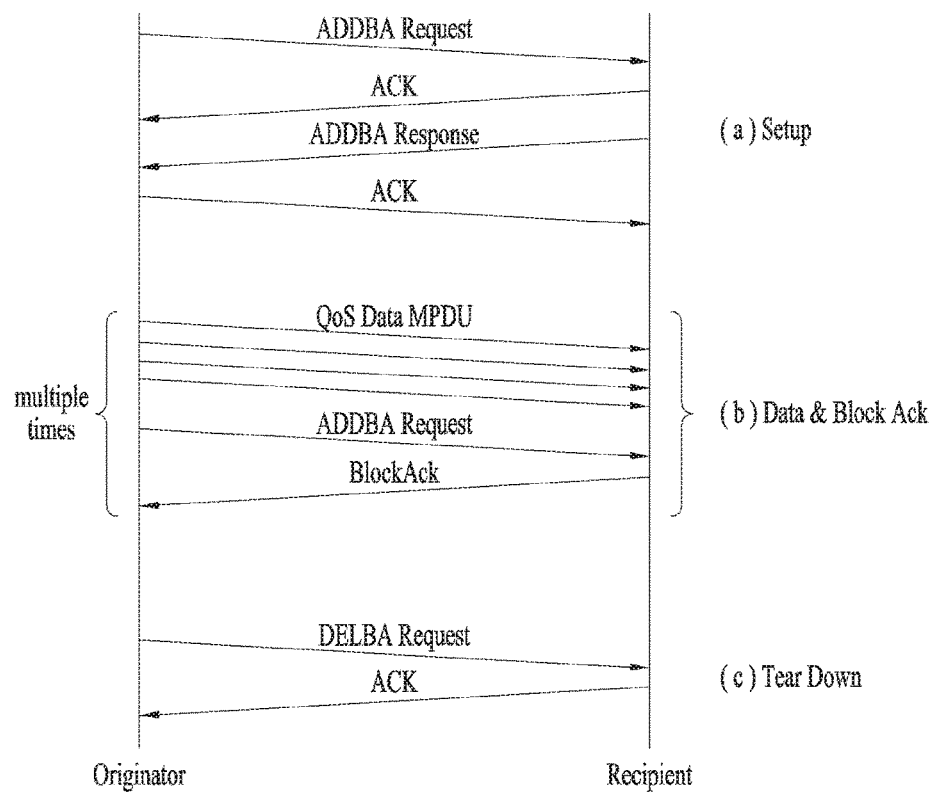
FIG. 3 is a diagram illustrating a block ACK mechanism used in a WLAN system.

FIG. 3 is a diagram illustrating a block ACK mechanism used in a WLAN system.

The block ACK mechanism may be initialized by an exchange of Add Block Acknowledgment (ADDBA) request/response frames as illustrated in FIG. 3 ((a) Setup step). After the block ACK mechanism is initialized, a block of Quality of Service (QoS) data frames may be transmitted by an originator to a recipient. Such a block may be started within a polled Transmission Opportunity (TXOP) or by winning Enhanced Distributed Channel Access (EDCA) contention. The number of frames in the block may be limited. MAC Packet Data Units (MPDUs) in the block of frames may be acknowledged by a Block ACK frame, which is requested by a BlockAckReq frame ((b) Data & Block ACK step).

When the originator has no data to transmit and a final block ACK exchange is completed, the originator may end the block ACK mechanism by transmitting a Delete Block Acknowledgment (DELBA) frame to the recipient. Upon receiving the DELBA frame, the recipient may release all resources allocated for Block ACK transfer ((c) Tear Down step).

Figure 4:
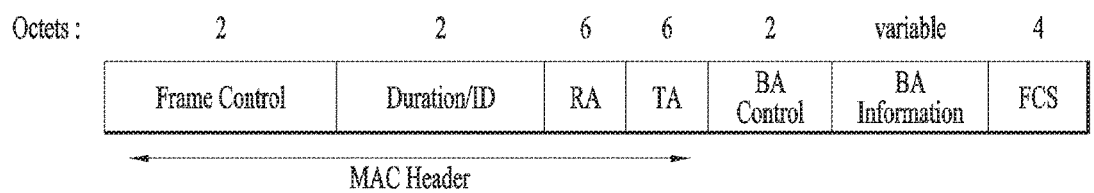
FIG. 4 is a diagram illustrating a basic configuration of a block ACK frame.

FIG. 4 is a diagram illustrating a basic configuration of a block ACK frame.

The block ACK frame may include a MAC Header field, a Block ACK (BA) Control field, and a BA Information field. The MAC Header field may include a Frame Control field, a Duration/ID field, an RA field, and a TA field. Herein, the RA field represents an address of a receiver STA and the TA field represents an address of a transmitter STA.

FIG. 5 is a diagram illustrating a detailed configuration of the BA Control field in FIG. 4.

A value of a BA ACK Policy subfield in the BA Control field may have the meaning shown in Table 1 below.

TABLE 1

| Value | Meaning |
| --- | --- |
| 0 | Normal Acknowledgment.<br>The BA Ack Policy subfield is set to this value when the sender requires immediate acknowledgement.<br>The addressee returns an Ack frame.<br>The value 0 is not used for data sent under HT-delayed Block Ack during a PSMP sequence.<br>The value 0 is not used in frames transmitted by DMG STAs. |
| 1 | No Acknowledgment.<br>The addressee sends no immediate response upon receipt of the frame.<br>The BA Ack Policy is set to this value when the sender does not require immediate acknowledgement.<br>The value 1 is not used in a Basic BlockAck frame outside a PSMP sequence.<br>The value 1 is not used in an Multi-TID BlockAck frame. |

Meanwhile, Multi-Traffic Identifier (TID), Compressed Bitmap, and GCR subfields in the BA Control field may determine possible Block ACK frame variants according to the following regulation.

TABLE 2

| Multi-TID subfield value | Compressed Bitmap subfield value | GCR subfield value | BlockAck frame variant |
| --- | --- | --- | --- |
| 0 | 0 | 0 | Basic BlockAck |
| 0 | 1 | 0 | Compressed BlockAck |
| 1 | 0 | 0 | Extended Compressed BlockAck |
| 1 | 1 | 0 | Multi-TID BlockAck |
| 0 | 0 | 1 | Reserved |
| 0 | 1 | 1 | GCR BlockAck |
| 1 | 0 | 1 | Reserved |
| 1 | 1 | 1 | Reserved |

FIG. 6 is a diagram illustrating a detailed configuration of the BA Information field in FIG. 4 and FIG. 7 is a diagram illustrating a configuration of a Block ACK Start Sequence Control subfield.

As illustrated in FIG. 6, the BA Information field may include a Block ACK Starting Sequence Control (SSC) subfield and a Block ACK Bitmap subfield.

As illustrated in FIG. 6, the Block ACK Bitmap subfield is 128 octets in length and thus may represent a reception status of 64 MAC Service Data Units (MSDUs). If a bit position n of the Block ACK Bitmap subfield is set to 1, this may indicate that an MPDU having an MPDU sequence control value corresponding to (SSC+n) has been successfully received, wherein SSC denotes a value of the Block ACK Starting Sequence Control subfield. In contrast, if the bit position n of the Block ACK Bitmap field is set to 0, this may indicate that the MPDU having the MPDU sequence control value corresponding to (SSC+n) has not been received. Each of values of an MPDU Sequence Control field and the Block ACK Starting Sequence Control subfield may be treated as a 16-bit unsigned integer. For unused fragment numbers of an MSDU, corresponding bits in a bitmap may be set to 0.

Figure 8:
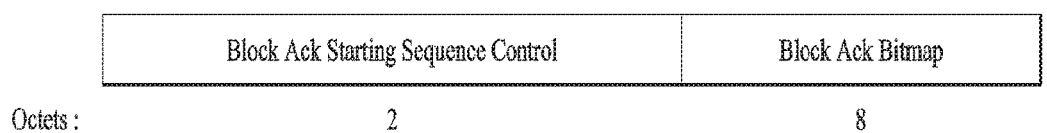
FIG. 8 is a diagram illustrating a configuration of a BS Information field of a compressed Block ACK frame.

FIG. 8 is a diagram illustrating a configuration of a BS Information field of a compressed Block ACK frame.

As illustrated in FIG. 8, a Block ACK Bitmap subfield of the BS Information field of the compressed Block ACK frame may be 8 octets in length and indicate a reception status of 64 MSDUs and A-MSDUs. The first bit of a bitmap corresponds to an MSDU or an A-MSDU matching a value of a Block ACK Starting Sequence Control subfield and respective bits may sequentially correspond to MSDUs or A-MSDUs after the above MSDU or the A-MSDU.

Figure 9:
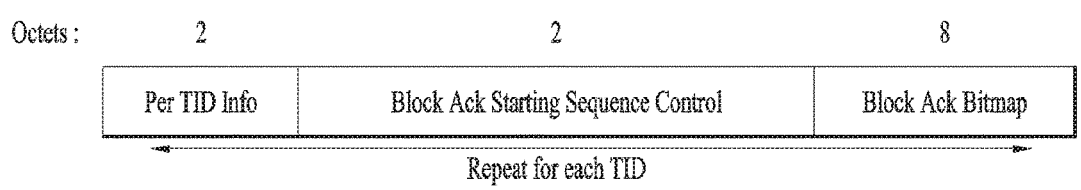
FIG. 9 is a diagram illustrating a BA Information field of a multi-TID Block ACK frame.

FIG. 9 is a diagram illustrating a BA Information field of a multi-TID Block ACK frame.

A TID_INFO subfield of the BA Information field of the multi-TID Block ACK frame contains information about the number of TIDs in the BA Information field. Specifically, a value of the TID_INFO subfield represents (the number of TIDs corresponding to information of the BA Information field)−1. For example, if the value of the TID_INFO subfield is 2, this may indicate that the BA Information field contains information about three TIDs.

Meanwhile, the multi-TID Block ACK frame may include a Per TID Info subfield in addition to a Block ACK Starting Sequence Control subfield and a Block ACK Bitmap subfield as illustrated in FIG. 9. The first emerging Per TID Info, Block ACK Starting Sequence Control, and Block ACK Bitmap subfields may be transmitted in correspondence to the lowest TID value and subsequently repeated subfields may correspond to the next TID. A triplet of these subfields may be repeated per TID.

Figure 10:
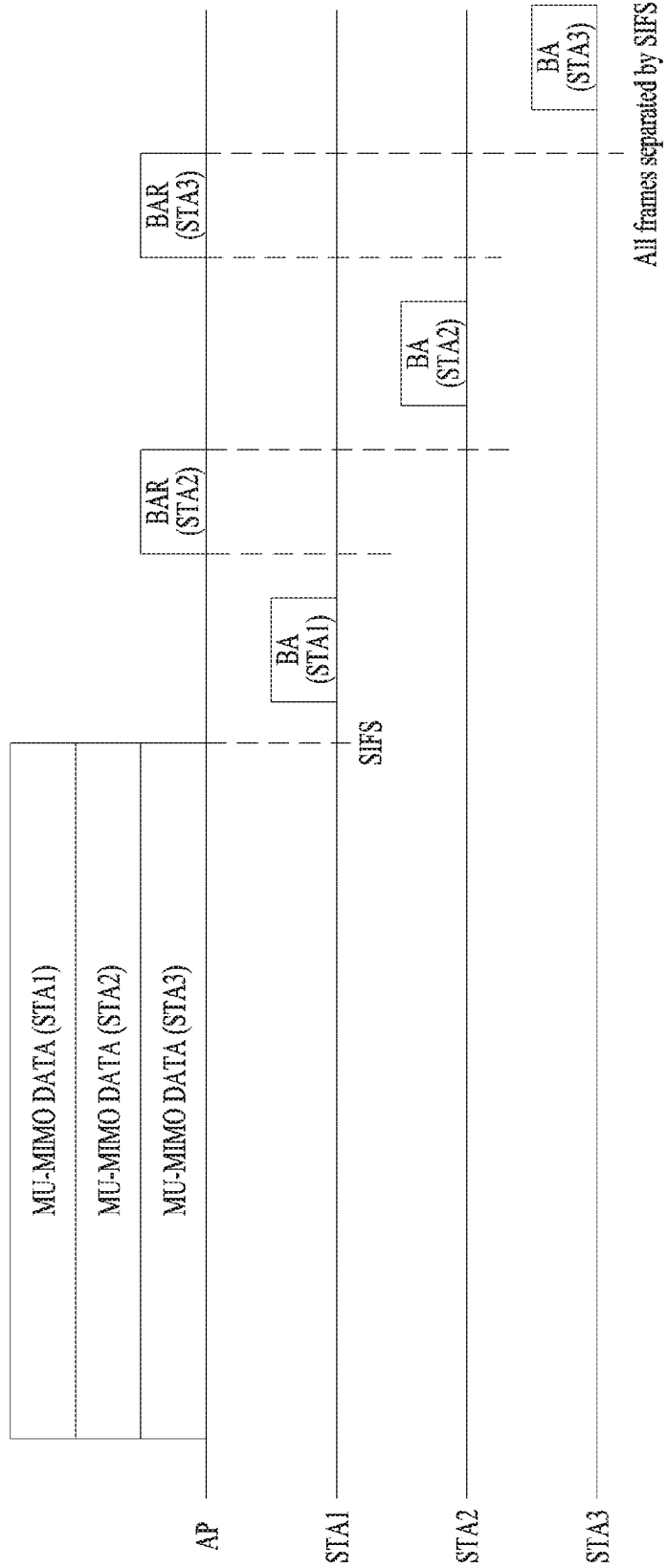
FIGS. 10 and 11 are diagrams for explaining the case in which a block ACK mechanism is applied to a DL MU-MIMO scheme.
Figure 11:
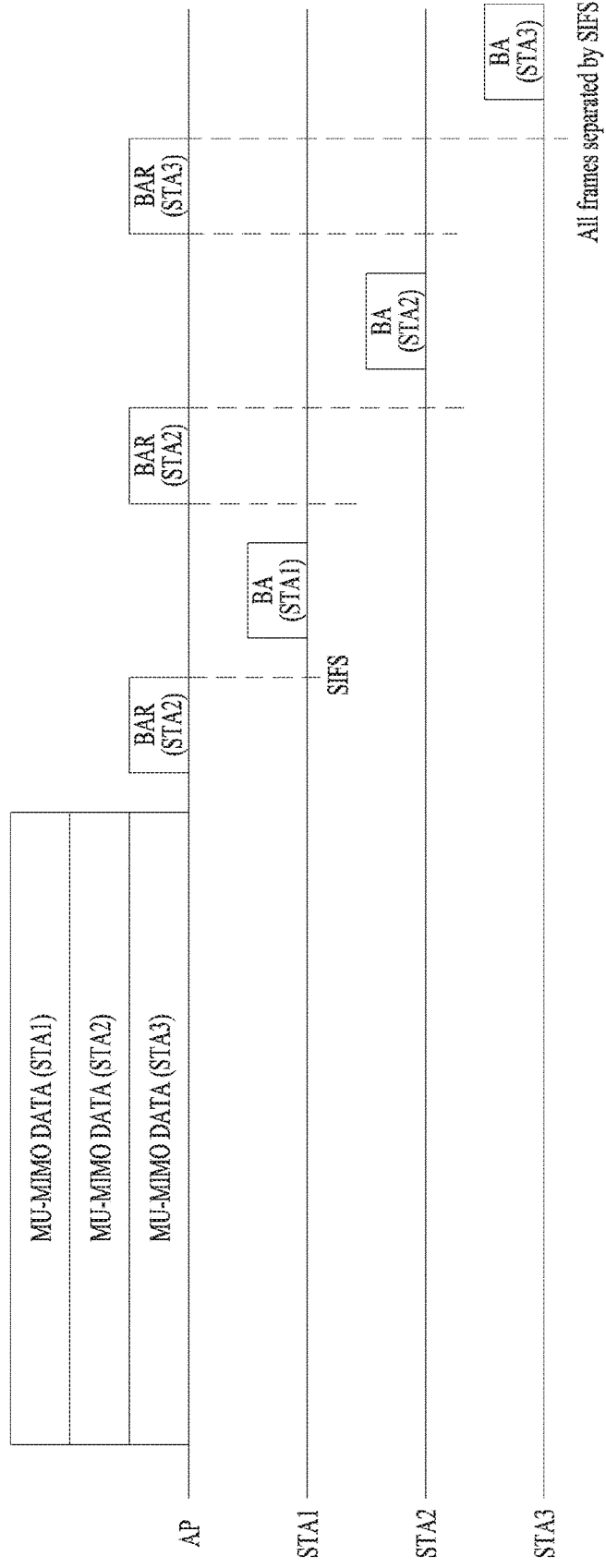

FIGS. 10 and 11 are diagrams for explaining the case in which a block ACK mechanism is applied to a DL MU-MIMO scheme.

As illustrated in FIGS. 10 and 11, an AP may transmit MU-MIMO data frames to a plurality of STAs STA 1 to STA 3.

It is assumed in FIG. 10 that frame exchange is performed after a Short InterFrame Space (SIFS) after an MU PLCP Packet Data Unit (PPDU) is transmitted. It is also assumed in FIG. 10 that for STA1, an implicit block ACK request is configured as ACK policy and, for STA 2 and STA 3, a block ACK is configured as ACK policy. Then, STA 1 may immediately transmit a BA frame after receiving a DL MU PPDU even without receiving a request for the block ACK. In contrast, the AP may perform polling by transmitting a BA request (BAR) frame to STA 2 and STA 3 and then STA 2 and STA 3 may transmit BA frames.

Meanwhile, FIG. 11 illustrates an example of performing a frame exchange without an SIFS after an MU PPDU is transmitted and it is assumed that a block ACK is configured as ACK policy for all STAs. Therefore, the AP may perform polling by transmitting a BAR frame to all STAs.

Figure 12:
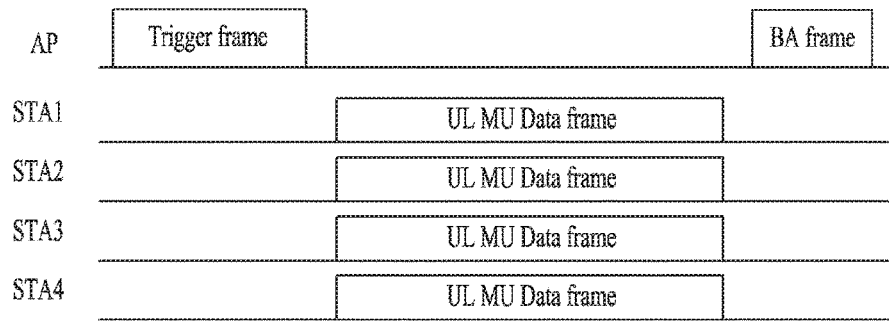
FIG. 12 is a diagram for explaining a UL MU transmission situation to which the present invention is applicable.

FIG. 12 is a diagram for explaining a UL MU transmission situation to which the present invention is applicable.

A UL MU transmission scheme may be used in an 802.11ax system as described above and may be initialized when an AP transmits a trigger frame to a plurality of STAs (e.g., STA 1 to STA 4) as illustrated in FIG. 12. The trigger frame may include UL MU allocation information (e.g. resource location and size, STA IDs, an MCS, and an MU type (MIMO, OFDMA, etc.)). Specific examples of information transmitted in the trigger frame may be as follows.

TABLE 3

Duration of a UL MU frame
Number of allocation (N)
Each allocation's Information
SU/MU
AID (for MU, as many AIDs as the number of STAs are additionally included.)
Power adjustment
Tone(/Resource) allocation information (e.g., bitmap)
MCS
Nsts TABLE 3-continued STBC
Coding
Beamformed
Etc.

Meanwhile, as illustrated in FIG. 12, the AP may obtain a TXOP for transmitting the trigger frame via a contention procedure in order to access a medium. The STAs may transmit UL data frames with a format indicated by the AP after an SIFS of the trigger frame. It is assumed that the AP according to the present invention transmits an ACK of the UL MU data frames through a BA frame.

However, the above-described BA frame for the UL MU frames considerably increases in size as compared with a BA frame for a UL MU frame, thereby causing a serious overhead problem. For example, the BA frame transmitted by STA 1 in FIGS. 10 and 11 includes BA information about data transmitted by the AP to STA 1, whereas the BA frame transmitted by the AP in FIG. 12 includes BA information about the UL MU data frames transmitted by STA 1 to STA 4. In addition, since the size of a MAC frame corresponds to 32 bytes when a compressed Block ACK is used and 150 bytes when a normal block ACK is used, overhead may be problematic.

Accordingly, an exemplary embodiment of the present invention proposes a method for efficiently transmitting a BA frame using a multi-TID block ACK frame format among the above-described BA frames in a UL MU situation.

Figure 13:
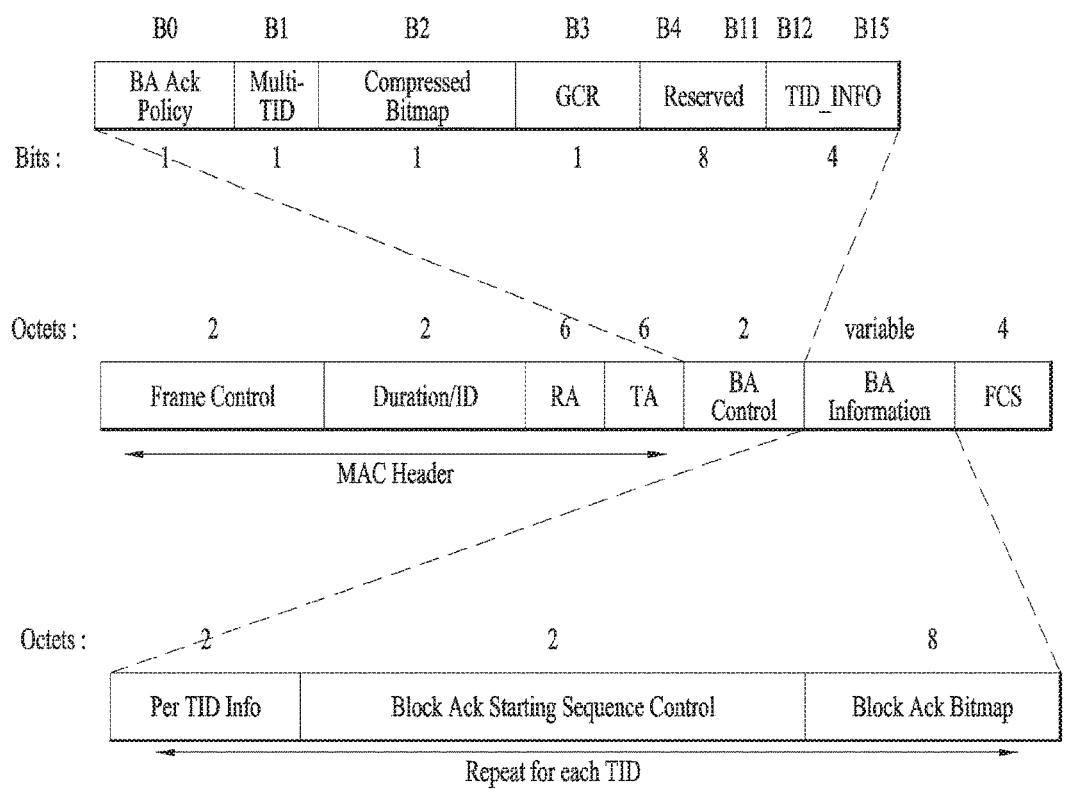
FIG. 13 is a diagram illustrating a frame structure to be used for a DL MU block ACK mechanism according to an exemplary embodiment of the present invention.

FIG. 13 is a diagram illustrating a frame structure to be used for a DL MU block ACK mechanism according to an exemplary embodiment of the present invention.

A multi-STA BA frame or M-BA frame to be used according to an embodiment of the present invention may basically have a multi-TID BA frame as illustrated in FIG. 13 and may desirably include an indicator indicating that a corresponding BA frame is not a simple multi-TID BA frame but a multi-STA BA frame or M-BA frame. Accordingly, a BA Information field may include BA information about different STAs as opposed to a conventional field.

In FIG. 13, in a BA control field, a multi-AID field indicates whether block ACK information including AID information is included in the BA information field, and block ACK information (block ACK starting sequence control and block ACK bitmap) may be included in each AID and transmitted.

In this case, when the number of STAs increases, block ACK frame overhead increases. For example, when there are 18 OFDMA STAs at 40 MHz, the block ACK frame has a size of 238 bytes and has overhead of about 85 symbols (340 μs) when transmission is performed with MCS 0.

To solve the aforementioned problem, the frame may be configured such that the frame optionally includes (1) a block ACK starting sequence control field and (2) a block ACK bitmap. For example, when an AP has successfully received data of all STAs, it is possible to use an indicator (e.g., B11 (ACK Type) in a Per TID information subfield of the BA information field and specific value information of the TID subfield) indicating that the data has been successfully received without including both the (1) block ACK starting sequence control field and (2) block ACK bitmap.

Meanwhile, multi-STA block ACK is a frame that carries ACK/BA information about multiple STAs, as described above. The multi-STA block ACK was designed by reusing the conventional multi-TID block ACK and includes as many pieces of BA information as the number indicated by TID_INFO in the BA control field. Each piece of BA information indicates ID information of an STA with an AID and indicates which TID is associated with BA using a TID value. Since TID_INFO indicates a total number of pieces of BA information, a maximum number of pieces of BA information that can be included is 16. This may limit the number of UL MU allocations. For example, a maximum number of UL OFDM allocations is 36 at 80 MHz but only 16 UL MU allocations can be performed due to restriction on the size of TID_INFO of M-BA.

To solve this problem, the following three embodiments are proposed.

First Embodiment

FIG. 14 is a diagram for explaining a method of extending the capacity of an M-BA frame according to an embodiment of the present invention.

Specifically, FIG. 14 illustrates extension of the value of TID_INFO included in the BA control field of multi-STA BA using reserved bits. That is, the size of TI_INFO can be set to a value greater than 4 bits by using some reserved bits of the BA control field for an MSB of TID_INFO and using the existing TID_INFO for an LSB.

In the above example, 2 bits of the reserved bits may be used for the MSB (most significant bit) of TID_INFO. Accordingly, 6 bits of B10 to B15 are used for the TID_INFO field to indicate a total number of pieces of BA information.

FIG. 14 shows an example and the size of TID_INFO (MSB) may be set to values (e.g., 1, 3, 4, etc.) other than 2 bits. In addition, some reserved bits may be used for the LSB instead of the MSB, and when some reserved bits are set as the LSB, indication indicating whether TID_INFO(LSB) is included may be additionally included. The indication indicates that TID_INFO(LSB) is used when set to 1. TID_INFO(LSB) can indicate the number of additional TIDs (additional TID_INFO) instead of TID_INFO(MSB). As many pieces of BA information as a value indicated by (the value indicated by additional TID_INFO)+(the value indicated by TID_INFO) can be included.

As many BA information fields as the number indicated by TID_INFO(MSB) and TID_INFO can follow the M-BA frame.

Second Embodiment

FIG. 15 is a diagram for explaining a method of extending the capacity of an M-BA frame according to another embodiment of the present invention.

If 16 or more pieces of BA information need to be included in an M-BA frame when multi-STA Block ACK is transmitted, the present embodiment proposes a method of including 16 (or 16 or fewer) pieces of BA information in the first M-BA frame, including the remaining BA information in the following M-BA frame and transmitting the M-BA frames. Here, it is desirable that a field indicating whether an M-BA frame is followed by another M-BA frame be included in the M-BA frame and the M-BA frame be transmitted. FIG. 15 shows an example in which the BA control field includes an M-BA extension subfield.

Here, M-BA Extension indicates whether another M-BA frame follows the corresponding M-BA frame (e.g., after SIFS). When the Extension indicator of an M-BA frame is set to 1, reception of the next M-BA frame can be expected in the case of an STA which has transmitted a UL MU frame but has no ACK/BA information corresponding to the AID thereof in the current M-BA frame (i.e., when BA information is not included).

When an STA which has transmitted a UL MU frame receives the current M-BA frame without receiving BA information thereof in previous M-BA frames, the M-BA Extension field is set to 0 in the current M-BA frame. When the BA information of the STA is not included in the corresponding M-BA frame, the STA can consider that the UL MU frame has not been successfully transmitted. In this case, the STA can wait for reception of a trigger frame for retransmission for a specific time or attempt retransmission in the form of SU.

It is desirable that an AP include pieces of BA information for the same STA in one M-BA frame and transmit the M-BA frame.

Figure 16:
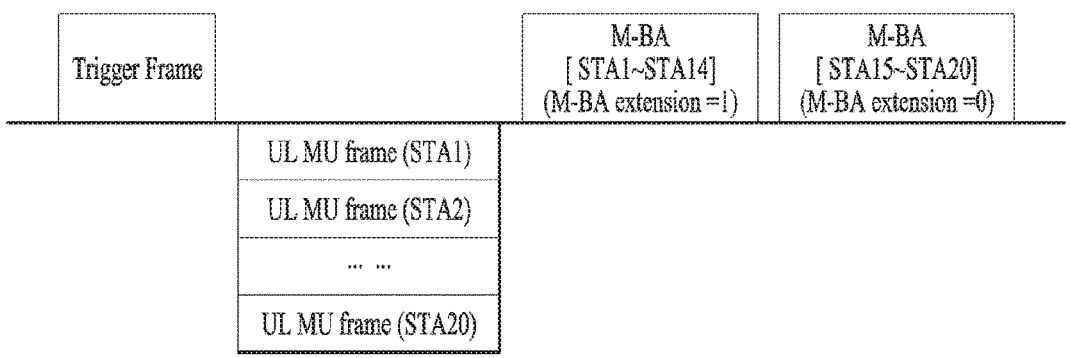
FIG. 16 is a diagram for explaining operating methods of STAs and an AP according to a second embodiment of the present invention.

FIG. 16 is a diagram for explaining operating methods of STAs and an AP according to a second embodiment of the present invention.

In the above-described example, an AP which has transmitted a trigger frame may receive UL MU frames from a plurality of STAs STA1 to STA20, include only BA information on STA1 to STA14 in the first M-BA frame and transmit the first M-BA frame. Here, the AP sets the extension field of the first M-BA field to 1 for transmission of an additional M-BA frame (second M-BA frame) because the AP has not transmitted BA information on all STAs in the first M-BA frame. Thereafter, the AP may include BA information on STA15 to STA20 in the successively transmitted second M-BA and transmit the second M-BA frame.

Third Embodiment

Figure 17:
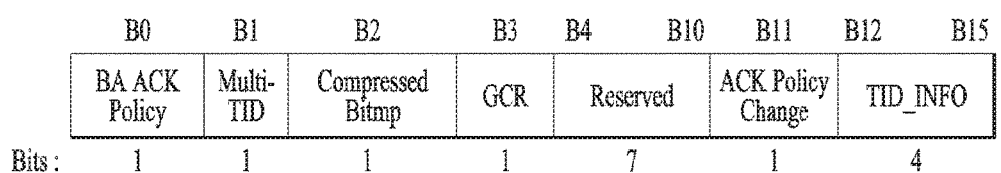
FIG. 17 is a diagram for explaining a method of changing an ACK policy in an M-BA frame according to another embodiment of the present invention.

FIG. 17 is a diagram for explaining a method of changing an ACK policy in an M-BA frame according to another embodiment of the present invention.

If 16 or more pieces of BA information need to be included in an M-BA frame when multi-STA Block ACK is transmitted, a method of including 16 (or 16 or fewer) pieces of BA information in the first M-BA frame and changing an ACK policy to block ACK for the remaining BA information is proposed. Information about change of the ACK policy (e.g., ACK Policy Change) may be included in the first M-BA frame and transmitted, as shown in FIG. 17. That is, some reserved bits of the BA control field or another field may be used for the purpose of ACK policy change, as shown in FIG. 17.

When STAs which have transmitted UL MU frames in which the ACK policy is set to implicit BA receive an M-BA frame, if the M-BA frame does not include BA information on the AID of an STA and ACK Policy Change of the received M-BA frame is set to 1, the STA can change the ACK policy thereof to BA(11) and then transmit a BAR frame to the AP to receive BA. If ACK Policy Change is set to 0 and BA information of an STA is not included in the M-BA frame, the STA can consider that the UL MU frame has not been successfully transmitted.

Figure 18:
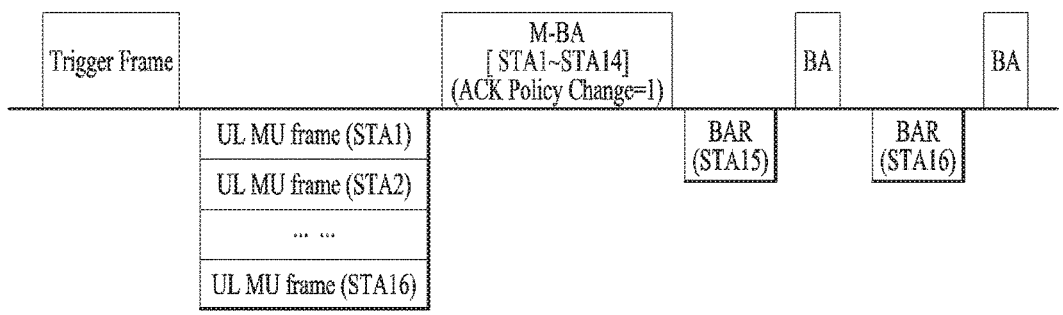
FIGS. 18 to 20 are diagrams for explaining a case in which STAs and an AP operate according to a third embodiment of the present invention.
Figure 19:
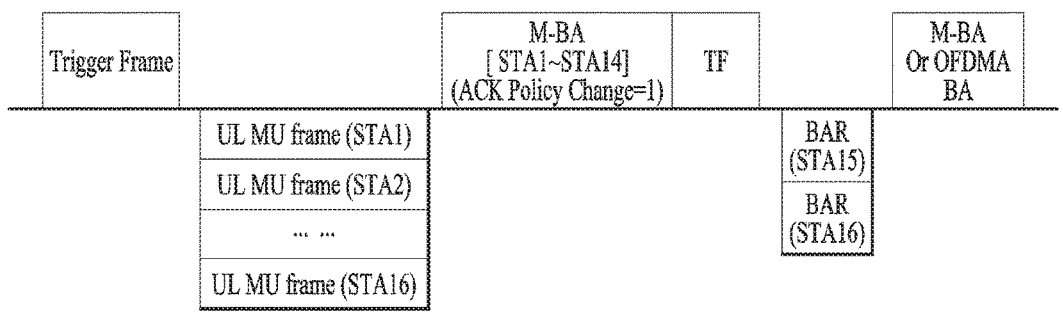
Figure 20:
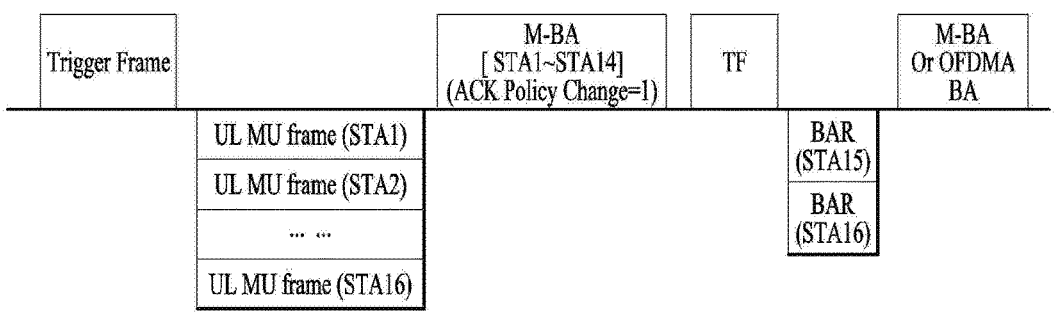

FIGS. 18 to 20 are diagrams for explaining a case in which STAs and an AP operate according to a third embodiment of the present invention.

In FIG. 18, the AP receives UL MU frame from STA1 to STA16, includes BA information on STA1 to STA14 in the first M-BA frame, sets ACK Policy Change to 1 and transmits the M-BA frame. When STA15 and STA16 receive an M-BA frame in which ACK Policy Change is set to 1, STA15 and STA16 can transmit BAR frames to the AP and receive BA because the first M-BA does not include BA information thereof.

In FIG. 19, the STAs and the AP operate in the same manner as in FIG. 18. FIG. 19 illustrates a case in which the AP transmits a trigger frame along with the first M-BA frame including BA information on STA1 to STA14 to allocate resource regions in which STA15 and STA16 will transmit BAR frames, receives the BAR frames from STA15 and STA16, and then transmits an M-BA frame including BA information on STA15 and STA16.

FIG. 20 is a diagram illustrating a case in which the AP transmits a trigger frame to STA15 and STA16 separately from the first M-BA frame, distinguished from FIG. 19.

Figure 21:
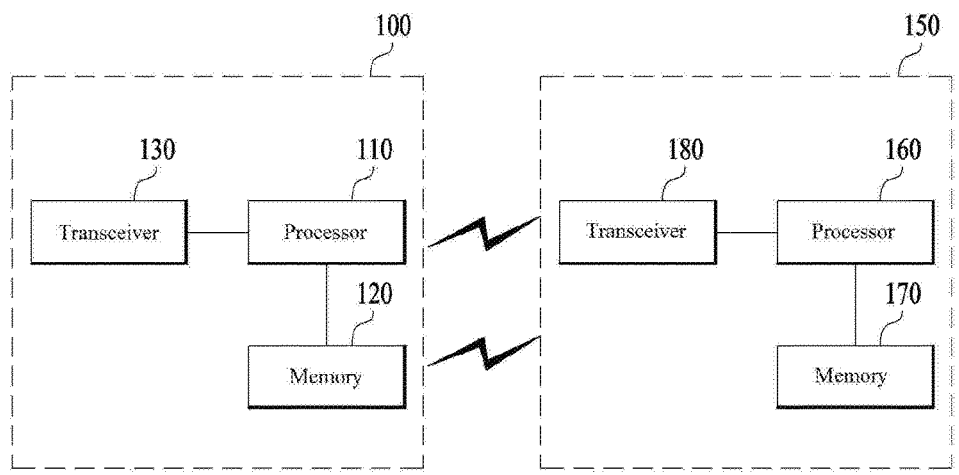
FIG. 21 is a diagram for explaining a device for implementing the aforementioned methods.

FIG. 21 is a diagram for explaining a device for implementing the above-described method.

A wireless device 800 of FIG. 21 may correspond to the above-described STA and a wireless device 850 of FIG. 21 may correspond to the above-described AP.

The STA 800 may include a processor 810, a memory 820, and a transceiver 830 and the AP 850 may include a processor 860, a memory 870, and a transceiver 860. The transceivers 830 and 880 may transmit/receive a wireless signal and may be implemented in a physical layer of IEEE 802.11/3GPP. The processors 810 and 860 are implemented in a physical layer and/or a MAC layer and are connected to the transceivers 830 and 880. The processors 810 and 860 may perform the above-described UL MU scheduling procedure.

The processors 810 and 860 and/or the transceivers 830 and 880 may include an Application-Specific Integrated Circuit (ASIC), a chipset, a logical circuit, and/or a data processor. The memories 820 and 870 may include a Read-Only Memory (ROM), a Random Access Memory (RAM), a flash memory, a memory card, a storage medium, and/or a storage unit. If an embodiment is performed by software, the above-described method may be executed in the form of a module (e.g., a process or a function) performing the above-described function. The module may be stored in the memories 820 and 870 and executed by the processors 810 and 860. The memories 820 and 870 may be located at the interior or exterior of the processors 810 and 860 and may be connected to the processors 810 and 860 via known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the various embodiments of the present invention have been described in the context of an IEEE 802.11 based WLAN system, the present invention is not applied thereto. The present invention is identically applicable to various WLAN systems in which an AP can perform a block Ack mechanism for a plurality of STAs.

What is claimed is:

1. A method by which an access point (AP) transmits block ACK (BA) signals for data transmitted from a plurality of stations (STAs) in a wireless LAN (WLAN) system, comprising:
    receiving data from the plurality of STAs; and
    transmitting a first multi-STA BA frame (M-BA frame) for data received from the plurality of STAs,
    wherein the first M-BA frame includes a MAC header field, a BA control field and a BA information field,
    last N bits of the BA control field indicate at least one of the number of pieces of BA information included in the first M-BA frame and information on a succeeding ACK frame, and
    N is set to 5 or more.

2. The method according to claim 1, wherein the last N bits of the BA control field indicate the number of pieces of BA information included in the first M-BA frame and are set to be equal to or greater than a maximum number of the plurality of STAs.

3. The method according to claim 1, wherein last M (M<N) bits of the BA control field indicate the number of pieces of BA information included in the first M-BA frame, and
    N−M bits preceding the last M bits of the BA control field indicate that the succeeding ACK frame is a second M-BA frame.

4. The method according to claim 3, wherein the first M-BA frame includes as many pieces of BA information as indicated by the last M bits of the BA control field from among the BA information on the plurality of STAs, and
    the second M-BA frame includes BA information that is not included in the first M-BA frame from among the BA information on the plurality of STAs.

5. The method according to claim 3, wherein M is set to 4.

6. The method according to claim 1, wherein last M bits (M<N) of the BA control field indicate the number of pieces of BA information included in the first M-BA frame, and
    N−M bits preceding the last M bits of the BA control field indicate that an ACK policy has changed to BA.

7. The method according to claim 6, wherein the first M-BA frame includes as many pieces of BA information as indicated by the last M bits of the BA control field from among the BA information on the plurality of STAs, and
    BA information that is not included in the first M-BA frame from among the BA information on the plurality of STAs is transmitted through a succeeding BA frame as the ACK policy is changed to BA.

8. The method according to claim 7, further comprising:
    receiving a BA request frame (BAR frame) from one or more STAs corresponding to BA information that is not included in the first M-BA frame from among the BA information on the plurality of STAs; and
    transmitting the succeeding BA frame in response to reception of the BAR frame.

9. The method according to claim 7, further comprising transmitting a trigger frame (TF) for inducing one or more STAs corresponding to BA information that is not included in the first M-BA frame from among the BA information on the plurality of STAs to transmit a BA request frame (BAR frame) along with the first M-BA frame or following the first M-BA frame.

10. The method according to claim 6, wherein M is set to 4.

11. A method by which a station (STA) receives a block ACK (BA) signal for transmitted data from an access point (AP) in a wireless LAN (WLAN) system, comprising:

transmitting data to the AP; and receiving a first multi-STA BA frame (M-BA frame) from the AP, wherein the first M-BA frame includes a MAC header field, a BA control field and a BA information field, last N bits of the BA control field indicate at least one of the number of pieces of BA information included in the first M-BA frame and information on a succeeding ACK frame, and N is set to 5 or more.

12. An access point (AP) device for transmitting block ACK (BA) signals for data transmitted from a plurality of stations (STAs) in a wireless LAN (WLAN) system, comprising:

a transceiver configured to receive data from the plurality of STAs and to transmit a first M-BA frame for data received from the plurality of STAs; and a processor connected to the transceiver to process the received data and the first M-BA frame, wherein the processor is configured such that the first M-BA frame includes a MAC header field, a BA control field and a BA information field, last N bits of the BA control field indicate at least one of the number of pieces of BA information included in the first M-BA frame and information on a succeeding ACK frame, and N is set to 5 or more.

13. A station (STA) device for receiving a block ACK (BA) signal from an access point (AP) in a wireless LAN (WLAN) system, comprising:

a transceiver configured to transmit data to the AP and to receive a first multi-STA BA frame (M-BA frame) from the AP; and a processor connected to the transceiver to process the transmitted data and the first M-BA frame, wherein the processor processes the first M-BA frame on the assumption that the first M-BA frame includes a MAC header field, a BA control field and a BA information field, last N bits of the BA control field indicate at least one of the number of pieces of BA information included in the first M-BA frame and information on a succeeding ACK frame, and N is set to 5 or more.

* * * * *